United States Patent
Wang et al.

(10) Patent No.: US 12,480,901 B2
(45) Date of Patent: Nov. 25, 2025

(54) SENSOR

(71) Applicant: KABUSHIKI KAISHA TOSHIBA, Tokyo (JP)

(72) Inventors: Ping Wang, Fujisawa Kanagawa (JP); Hiroaki Yamazaki, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 445 days.

(21) Appl. No.: 17/900,299

(22) Filed: Aug. 31, 2022

(65) Prior Publication Data
US 2023/0221269 A1 Jul. 13, 2023

(30) Foreign Application Priority Data

Jan. 12, 2022 (JP) .................................. 2022-002757

(51) Int. Cl.
*G01N 25/18* (2006.01)
*G01F 1/696* (2006.01)

(52) U.S. Cl.
CPC ............. *G01N 25/18* (2013.01); *G01F 1/696* (2013.01)

(58) Field of Classification Search
CPC .... G01N 25/18; G01N 27/18; G01N 33/0009; G01F 1/696
See application file for complete search history.

(56) References Cited

U.S. PATENT DOCUMENTS

| | | | |
|---|---|---|---|
| 5,515,295 A * | 5/1996 | Wang | G01F 1/6845 702/45 |
| 5,605,612 A | 2/1997 | Park et al. | |
| 2004/0099057 A1 * | 5/2004 | Hornung | G01F 1/6845 73/204.26 |
| 2005/0182574 A1 | 8/2005 | Sano et al. | |

(Continued)

FOREIGN PATENT DOCUMENTS

| | | |
|---|---|---|
| JP | H7-198649 A | 8/1995 |
| JP | 2001-355800 A | 12/2001 |

(Continued)

OTHER PUBLICATIONS

Y. Hayashi et al., "Integrated Hybrid MEMS Hydrogen Sensor with High Sensitivity and High Dynamic Range," IEEJ Trans. on Sensors and Micromachines, vol. 140, No. 7, pp. 158-164 (2020).

(Continued)

*Primary Examiner* — Fatemeh Esfandiari Nia
(74) *Attorney, Agent, or Firm* — Finnegan, Henderson, Farabow, Garrett & Dunner, LLP

(57) ABSTRACT

According to one embodiment, a sensor includes a detector. The detector includes a first resistance member, a second resistance member, a third resistance member, and a conductive member. A position of the third resistance member in a first direction from the first resistance member to the second resistance member is between a position of the first resistance member in the first direction and a position of the second resistance member in the first direction. A second direction from the conductive member to the third resistance (Continued)

member crosses the first direction. A third electrical resistance of the third resistance member is configured to change depending on a target substance around the detector.

19 Claims, 8 Drawing Sheets

(56) References Cited

U.S. PATENT DOCUMENTS

| | | | |
|---|---|---|---|
| 2016/0131511 A1* | 5/2016 | Shirai | G01F 1/696 |
| | | | 73/204.25 |
| 2017/0030873 A1 | 2/2017 | Gellert | |
| 2020/0011716 A1* | 1/2020 | Grudin | G01F 1/6888 |
| 2020/0080954 A1 | 3/2020 | Yamazaki | |
| 2021/0048401 A1* | 2/2021 | Hornung | G01N 25/18 |
| 2022/0178855 A1* | 6/2022 | Monnin | G01F 1/696 |

FOREIGN PATENT DOCUMENTS

| | | |
|---|---|---|
| JP | 2005-227090 A | 8/2005 |
| JP | 2016-138797 A | 8/2016 |
| JP | 2020-41893 A | 3/2020 |

OTHER PUBLICATIONS

G. de Graaf et al., "A MEMS Flow Compensated Thermal Conductivity Detector for Gas Sensing," Eurosensors 2015, pp. 1265-1268 (2015).

Japan Patent Office, Office Action in JP App. No. 2022-002757, 2 pages, and machine translation, 4 pages (Dec. 11, 2024).

\* cited by examiner

SENSOR

CROSS-REFERENCE TO RELATED APPLICATIONS

This application is based upon and claims the benefit of priority from Japanese Patent Application No. 2022-002757, filed on Jan. 12, 2022; the entire contents of which are incorporated herein by reference.

FIELD

Embodiments described herein relate generally to a sensor

BACKGROUND

For example, there is a sensor based on a MEMS (Micro Electro Mechanical Systems) element or the like. It is desired to improve the accuracy of the sensor.

DETAILED DESCRIPTION

Figure 1A:
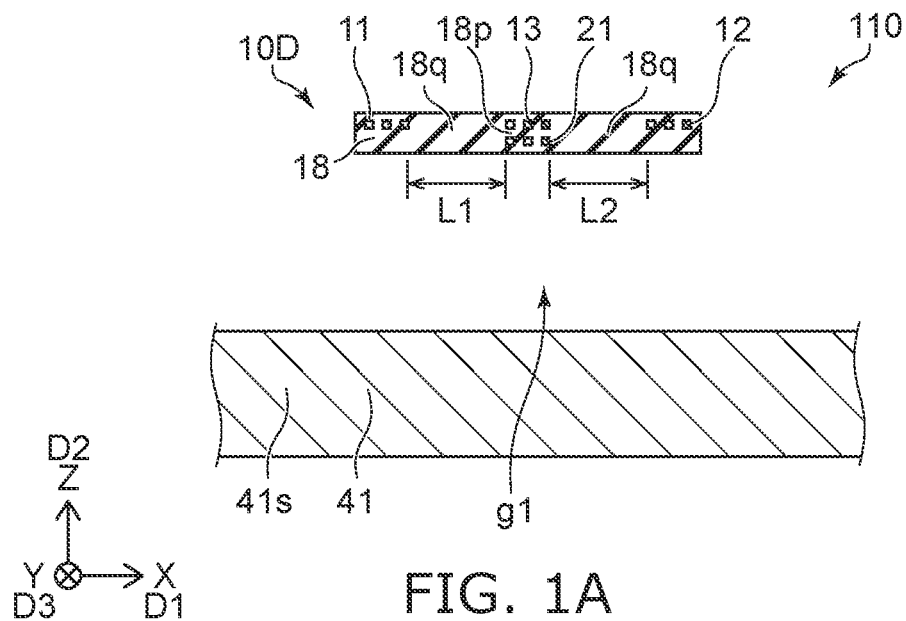
FIGS. 1A and 1B are schematic cross-sectional views illustrating a sensor according to a first embodiment.

According to one embodiment, a sensor includes a detector. The detector includes a first resistance member, a second resistance member, a third resistance member, and a conductive member. A position of the third resistance member in a first direction from the first resistance member to the second resistance member is between a position of the first resistance member in the first direction and a position of the second resistance member in the first direction. A second direction from the conductive member to the third resistance member crosses the first direction. A third electrical resistance of the third resistance member is configured to change depending on a target substance around the detector.

Various embodiments are described below reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
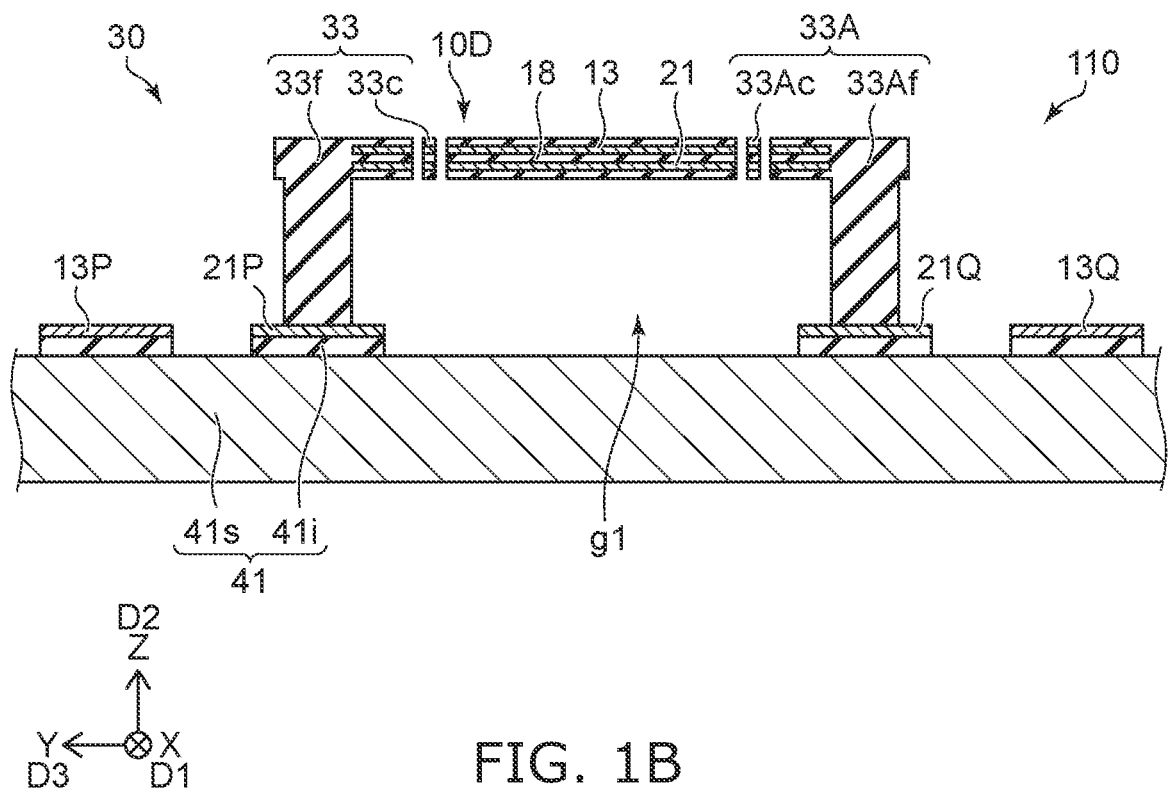

FIGS. 1A and 1B are schematic cross-sectional views illustrating a sensor according to a first embodiment.

Figure 2:
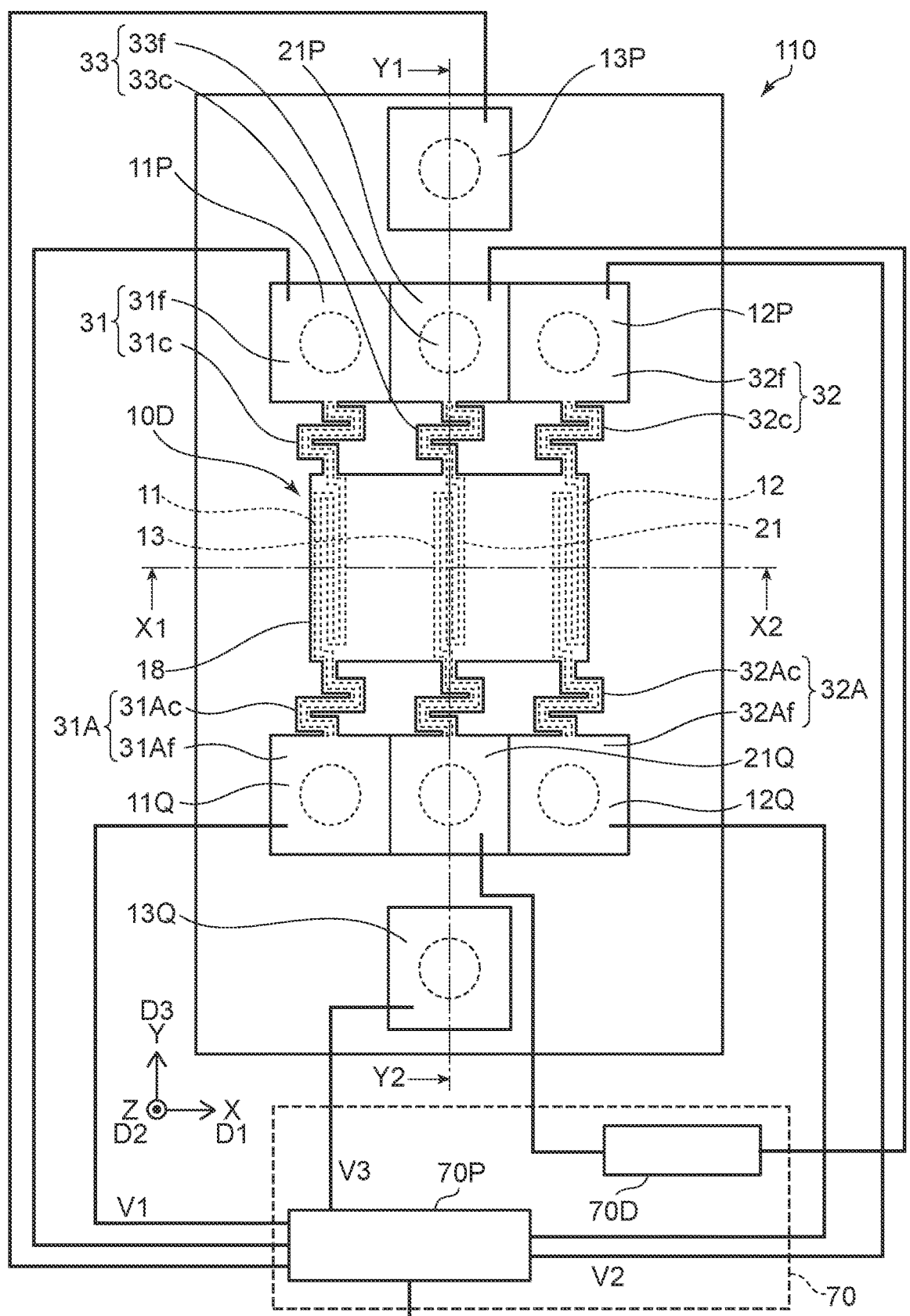
FIG. 2 is a schematic plan view illustrating the sensor according to the first embodiment.

FIG. 2 is a schematic plan view illustrating the sensor according to the first embodiment.

FIG. 1A is a cross-sectional view taken along the line X1-X2 of FIG. 2. FIG. 16 is a cross-sectional view taken along the line Y1-Y2 of FIG. 2.

As shown in FIGS. 1A, 1B and 2, a sensor 110 according to the embodiment includes a detector 10D. The detector 10D includes a first resistance member 11, a second resistance member 12, a third resistance member 13, and a conductive member 21.

A direction from the first resistance member 11 to the second resistance member 12 is defined as a first direction D1. A position of the third resistance member 13 in the first direction D1 is between a position of the first resistance member 11 in the first direction D1 and a position of the second resistance member 12 in the first direction D1.

The first direction is defined as an X-axis direction. One direction perpendicular to the X-axis direction is defined as a Z-axis direction. A direction perpendicular to the X-axis direction and the Z-axis direction is defined as a Y-axis direction. For example, the third resistance member 13 is between the first resistance member 11 and the second resistance member 12 in the first direction D1.

A second direction D2 from the conductive member 21 to the third resistance member 13 crosses the first direction. The second direction D2 is, for example, the Z-axis direction.

As will be described later, the third electrical resistance of the third resistance member 13 can be changed according to the target substance (for example, gas) around the detector 10D. The third resistance member 13 functions as, for example, a gas sensor part. The first resistance member 11 and the second resistance member 12 function as, for example, a gas flow sensor part.

In the embodiment, one detector 10D includes a gas sensor part and a flow sensor part, whereby the target substance can be detected with high accuracy.

As shown in FIG. 2, the sensor 110 may include a controller 70. The controller 70 includes, for example, a circuit part 70D and a processor 70P.

For example, a current is supplied to the conductive member 21. The current is supplied by, for example, the circuit part 70D. For example, a voltage is applied to the conductive member 21. The voltage is applied by, for example, the circuit part 70D. The temperature of the conductive member 21 rises due to the current (and voltage) supplied to the conductive member 21. The temperature rise is due to Joule heat. As a result, the temperature of the third resistance member 13 rises. The heat quantity of the third resistance member 13 changes according to the target substance included in the space around the third resistance member 13. The degree of change in the heat quantity depends on the thermal conductivity of the detection target included in the surrounding space. As the temperature of the third resistance member 13 changes, the electrical resistance (third electrical resistance) of the third resistance member 13 changes. The change in the third electrical resistance is detected by, for example, the processor 70P. By detecting the change in the third electrical resistance, the detection target included in the space can be detected.

When the target substance flows and moves, the accuracy of detection of the detection target by the third resistance member 13 may decrease. For example, the heat conduction characteristics change depending on the presence or absence of a flow or the flow rate (for example, a flow velocity) of the target substance. The temperature of the third resistance member 13 is affected by the flow of the target substance. This may make detection with high accuracy difficult.

On the other hand, the temperature of the first resistance member 11 and the temperature of the second resistance member 12 are affected by the flow of the target substance. For example, when the first resistance member 11 is upstream of the flow of the target substance and the second resistance member 12 is downstream of the flow of the target substance, the temperature of the first resistance member 11 is lower than the temperature of the second resistance member 12. A difference is generated between the first electrical resistance of the first resistance member 11 and the second electrical resistance of the second resistance member 12, depending on a difference between the temperature of the first resistance member 11 and the temperature of the second resistance member 12. The difference in electrical resistance depends on the flow rate of the target substance.

In the embodiment, a value obtained from the third electrical resistance is corrected according to the change in the difference between the first electrical resistance and the second electrical resistance. That is, the correction is performed using the flow rate of the target substance, whereby the influence of the flow rate of the target substance is suppressed. It is possible to provide a sensor that can improve the accuracy.

As shown in FIG. 1A, the detector 10D further includes an insulating member 18. A part 18p of the insulating member 18 is provided between the third resistance member 13 and the conductive member 21. Another part 18q of the insulating member 18 is provided between the first resistance member 11 and the third resistance member 13 and between the second resistance member 12 and the third resistance member 13. The detector 10D is integrated.

In such a configuration, the characteristics of the first resistance member 11, the second resistance member 12, and the third resistance member 13 are more stable than when these resistance members are separately provided. Higher accuracy detection is possible.

As shown in FIG. 1B, the sensor 110 may include a base body 41 and a support member 30. In this example, the base body 41 includes a substrate 41s and an insulating film 41i. The substrate 41s may be, for example, a semiconductor substrate (for example, a silicon substrate). The substrate 41s may include, for example, a semiconductor circuit or the like. The substrate 41s may include a connecting member such as a via electrode.

The support member 30 is fixed to the base body 41. The support member 30 supports the detector 10D. A first gap g1 is provided between the base body 41 and the detector 10D. The first gap g1 can suppress heat conduction from the detector 10D toward the base body 41. Higher accuracy detection is possible.

As shown in FIG. 1B, in this example, the support member 30 includes a third support portion 33. The third support portion 33 includes a third fixing portion 33f and a third connection portion 33c, The third fixing portion 33f is fixed to the base body 41. The third connection portion 33c is supported by the third fixing portion 33f. The third connection portion 33c supports the detector 10D, The first gap g1 is also provided between the base body 41 and the third connection portion 33c.

In this example, the support member 30 includes a third counter support portion 33A. The third counter support portion 33A includes a third counter fixing portion 33Af and a third counter connection portion 33Ac. The third counter fixing portion 33Af is fixed to the base body 41. The third counter connection portion 33Ac is supported by the third counter fixing portion 33Af. The third counter connection portion 33Ac supports the detector 10D, The first gap g1 is also provided between the base body 41 and the third counter connection portion 33Ac. In a third direction D3 which crosses a plane including the first direction D1 and the second direction D2, the detector 10D is between the third fixing portion 33f and the third counter fixing portion 33Af. The third direction D3 is, for example, the Y-axis direction.

A conductive member (not shown) electrically connected to the third resistance member 13 may pass through the third fixing portion 33f, the third counter fixing portion 33Af, the third connection portion 33c, and the third counter connection portion 33Ac, A conductive member (not shown) electrically connected to the conductive member 21 may pass through the third fixing portion 33f, the third counter fixing portion 33Af, the third connection portion 33c, and the third counter connection portion 33Ac.

As shown in FIG. 2, for example, a conductive member terminal 21P and a counter conductive member terminal 21Q are provided. The conductive member terminal 21P is electrically connected to one end of the conductive member 21. The counter conductive member terminal 21Q is electrically connected to the other end of the conductive member 21. A current is supplied from the circuit part 70D to the conductive member 21 via these terminals. A voltage is applied to the conductive member 21 by the circuit part 70D via these terminals.

As shown in FIG. 2, for example, a third resistance terminal 13P and a third counter resistance terminal 13Q are provided. The third resistance terminal 13P is electrically connected to one end of the third resistance member 13. The third counter resistance terminal 13Q is electrically connected to the other end of the third resistance member 13. Through these terminals, a third value V3 corresponding to the third electrical resistance of the third resistance member 13 is detected by the processor 70P.

As shown in FIG. 2, for example, a first resistance terminal 11P and a first counter resistance terminal 11Q are provided. The first resistance terminal 11P is electrically connected to one end of the first resistance member 11. The first counter resistance terminal 11Q is electrically connected to the other end of the first resistance member 11. Through these terminals, a first value V1 corresponding to the first electrical resistance of the first resistance member 11 is detected by the processor 70P.

As shown in FIG. 2, for example, a second resistance terminal 12P and a second counter resistance terminal 12Q are provided. The second resistance terminal 12P is electrically connected to one end of the second resistance member 12. The second counter resistance terminal 12Q is electrically connected to the other end of the second resistance member 12. Through these terminals, a second value V2 corresponding to the second electrical resistance of the second resistance member 12 is detected by the processor 70P.

As shown in FIG. 2, in this example, the support member 30 includes a first support portion 31. The first support portion 31 includes a first fixing portion 31f and a first connection portion 31c. The first fixing portion 31f is fixed to the base body 41. The first connection portion 31c is supported by the first fixing portion 31f. The first connection portion 31c supports the detector 10D. The first gap g1 is also provided between the base body 41 and the first connection portion 31c.

The support member 30 includes a first counter support portion 31A. The first counter support portion 31A includes a first counter fixing portion 31Af and a first counter connection portion 31Ac. The first counter fixing portion 31Af is fixed to the base body 41. The first counter connection portion 31Ac is supported by the first counter fixing portion 31Af. The first counter connection portion 31Ac supports the detector 10D, The first gap g1 is also provided between the base body 41 and the first counter connection portion 31Ac. In the third direction D3, the detector 10D is between the first fixing portion 31f and the first counter fixing portion 31Af.

A conductive member (not shown) electrically connected to the first resistance member 11 may pass through the first fixing portion 31f, the first counter fixing portion 31Af, the first connection portion 31c, and the first counter connection portion 31Ac.

As shown in FIG. 2, in this example, the support member 30 includes a second support portion 32, The second support portion 32 includes a second fixing portion 32f and a second connection portion 32c, The second fixing portion 32f is fixed to the base body 41. The second connection portion 32c is supported by the second fixing portion 32f. The second connection portion 32c supports the detector 10D, The first gap g1 is also provided between the base body 41 and the second connection portion 32c.

The support member 30 includes a second counter support portion 32A, The second counter support portion 32A includes a second counter fixing portion 32Af and a second counter connection portion 32Ac. The second counter fixing portion 32Af is fixed to the base body 41. The second counter connection portion 32Ac is supported by the second counter fixing portion 32Af. The second counter connection portion 32Ac supports the detector 10D. The first gap g1 is also provided between the base body 41 and the second counter connection portion 32Ac. In the third direction D3, the detector 10D is between the second fixing portion 32f and the second counter fixing portion 32Af.

A conductive member (not shown) electrically connected to the second resistance member 12 may pass through the second fixing portion 32f, the second counter fixing portion 32Af, the second connection portion 32c, and the second counter connection portion 32Ac.

Figure 3A:
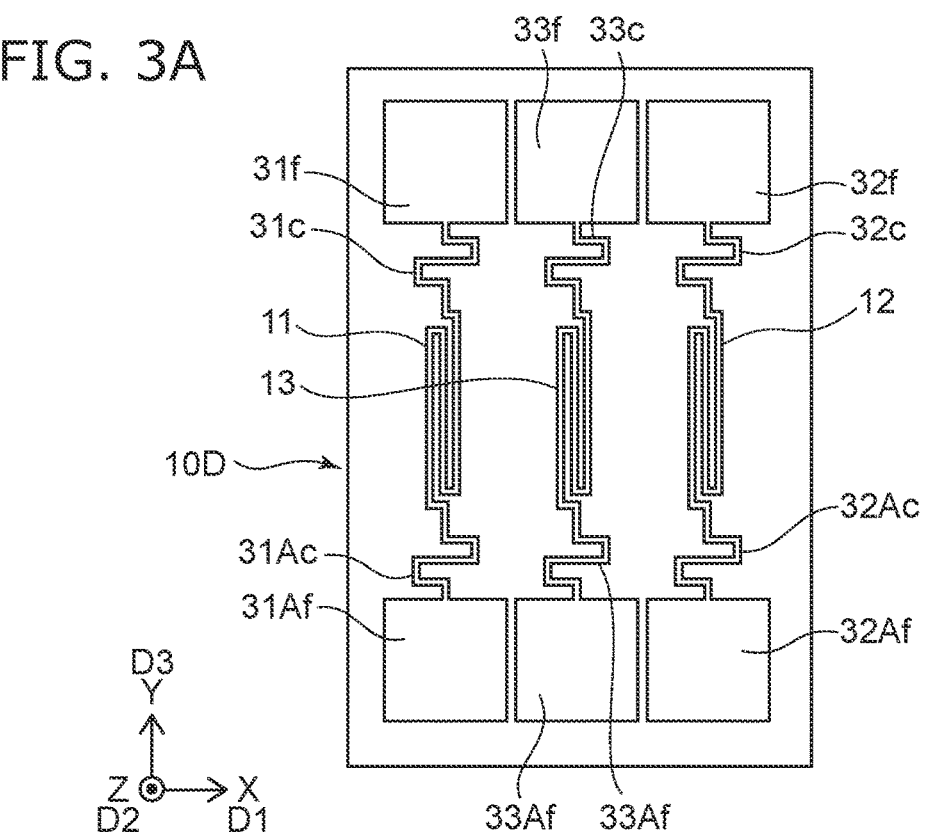
FIGS. 3A and 3B are schematic plan views illustrating a part of the sensor according to the first embodiment.
Figure 3B:
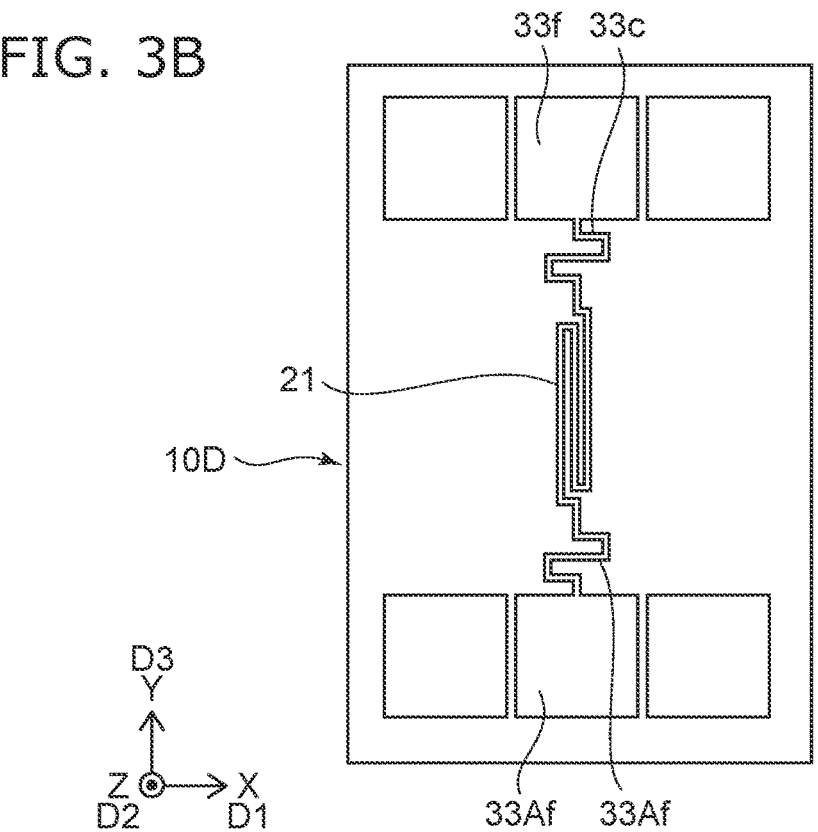

FIGS. 3A and 3B are schematic plan views illustrating a part of the sensor according to the first embodiment.

FIG. 3A illustrates patterns of the first resistance member 11, the second resistance member 12, and the third resistance member 13 in the sensor 110. FIG. 3B illustrates the pattern of the conductive member 21 in the sensor 110, The resistance members may have a meander structure. The conductive member 21 may have a meander structure.

In the following an example of the characteristics of the sensor 110 will be described.

Figure 4:
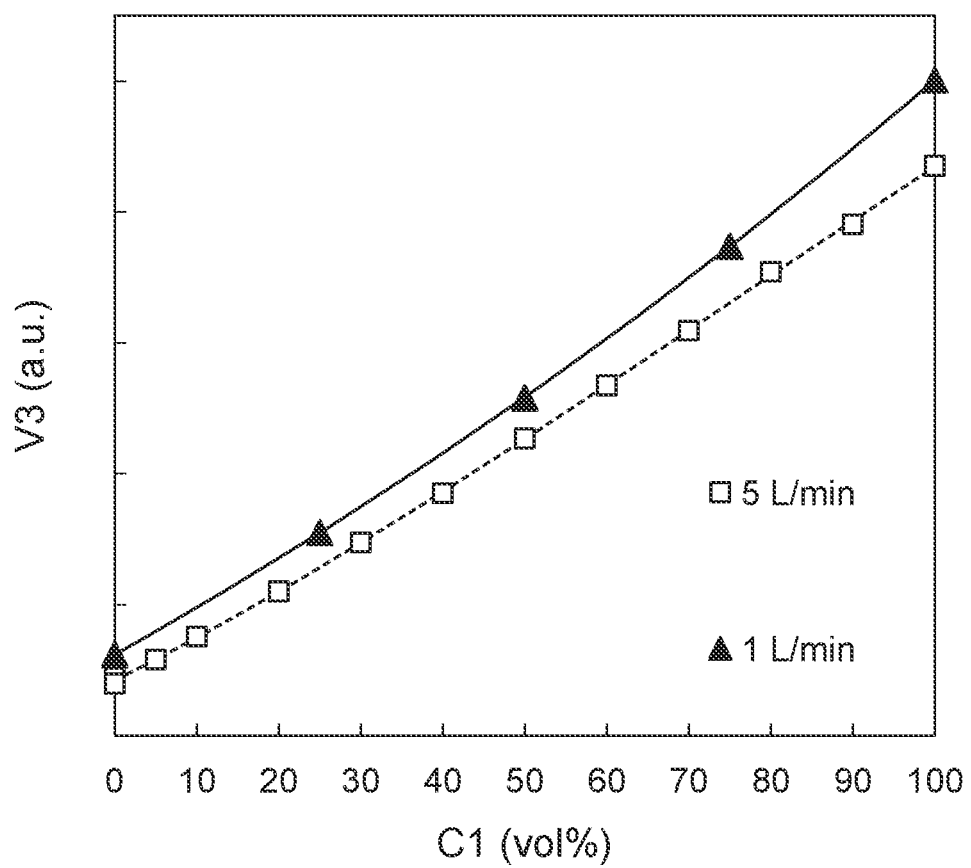
FIG. 4 is a graph illustrating characteristics of the sensor.

FIG. 4 is a graph illustrating characteristics of the sensor.

The horizontal axis of FIG. 4 is a concentration C1 of the detection target (substance) in the space around the detector 10D, In this example, the detection target (substance) is carbon dioxide. The vertical axis is a signal (third value V3) obtained from the third resistance member 13. The signal (third value V3) corresponds to, for example, the third electrical resistance of the third resistance member 13, The third value V3 is, for example, a voltage. FIG. 3 illustrates the characteristics when the flow rate of the target substance (gas) is 1 L/min and the characteristics when the flow rate is 5 L/min.

As shown in FIG. 3, the signal (third value V3) at the same concentration C1 changes when the flow rate is different. By correcting the signal (third value V3) based on the characteristics of this change, the concentration C1 in which the influence of the flow rate is suppressed can be obtained.

As described above, the flow rate can be detected by the first resistance member 11 and the second resistance member 12. For example, a difference between the first temperature of the first resistance member 11 and the second temperature of the second resistance member 12 changes depending on the flow rate of the target substance in an orientation from the first resistance member 11 to the second resistance member 12. For example, a difference between the first electrical resistance of the first resistance member 11 and the second electrical resistance of the second resistance member 12 changes depending on the flow rate of the target substance in the orientation from the first resistance member 11 to the second resistance member 12.

The processor 70P (see FIG. 2) of the controller 70 is configured to obtain the first value V1 corresponding to the first electrical resistance of the first resistance member 11, and the second value V2 corresponding to the second electrical resistance of the second resistance member 12, and the third value V3 corresponding to the third electrical resistance of the third resistance member 13 (see FIG. 2). As described above, the third value V3 changes depending on the target substance. For example, the third value V3 changes depending on the type of the target substance, the concentration of the target substance in the space, and the flow rate of the target substance.

The processor 70P is configured to output a fourth value V4 obtained by correcting the third value V3 based on the difference between the first value V1 and the second value V2. The correction based on the difference between the first value V1 and the second value V2 suppresses the influence of the flow rate of the target substance. The fourth value V4 obtained by the correction has high accuracy.

As shown in FIG. 1A, a distance along the first direction D1 between the first resistance member 11 and the third resistance member 13 is defined as a first distance L1. A distance along the first direction D1 between the second resistance member 12 and the third resistance member 13 is defined as a second distance L2, The first distance L1 is substantially the same as the second distance L2. For example, the first distance L1 is not less than 0.9 times and not more than 1.1 times the second distance L2. The first resistance member 11 and the second resistance member 12 are provided at positions substantially symmetrical with respect to the third resistance member 13. As a result, the characteristics of the first resistance member 11 become substantially the same as the characteristics of the second resistance member 12. Higher accuracy correction can be performed.

As shown in FIG. 1A, the third resistance member 13 is between the first resistance member 11 and the second resistance member 12 in the first direction D1. For example, the third resistance member 13 is in the same layer as the first resistance member 11. For example, the third resistance member 13 is in the same layer as the second resistance member 12.

Figure 5:
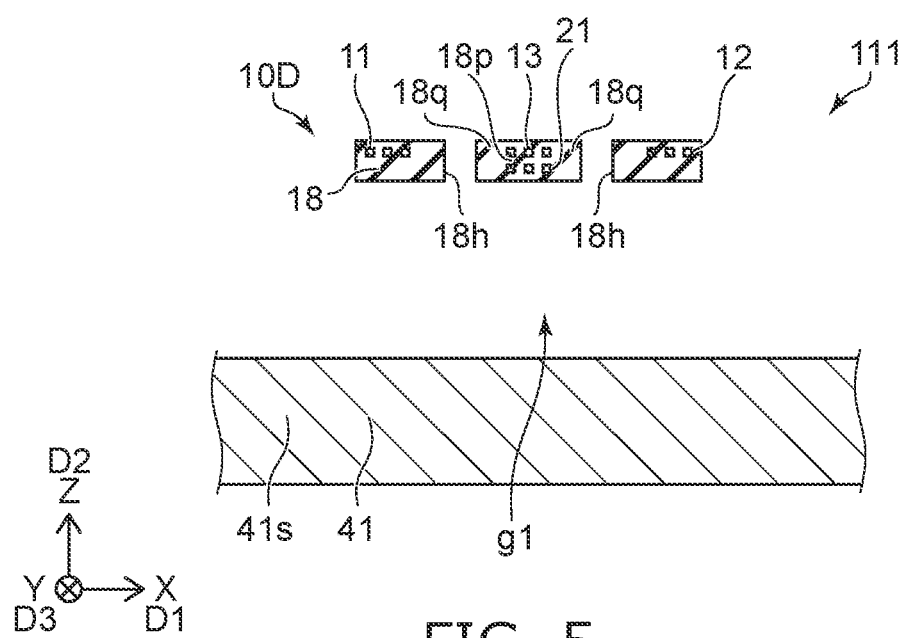
FIG. 5 is a schematic cross-sectional view illustrating a sensor according to the first embodiment.

FIG. 5 is a schematic cross-sectional view illustrating a sensor according to the first embodiment.

Figure 6:
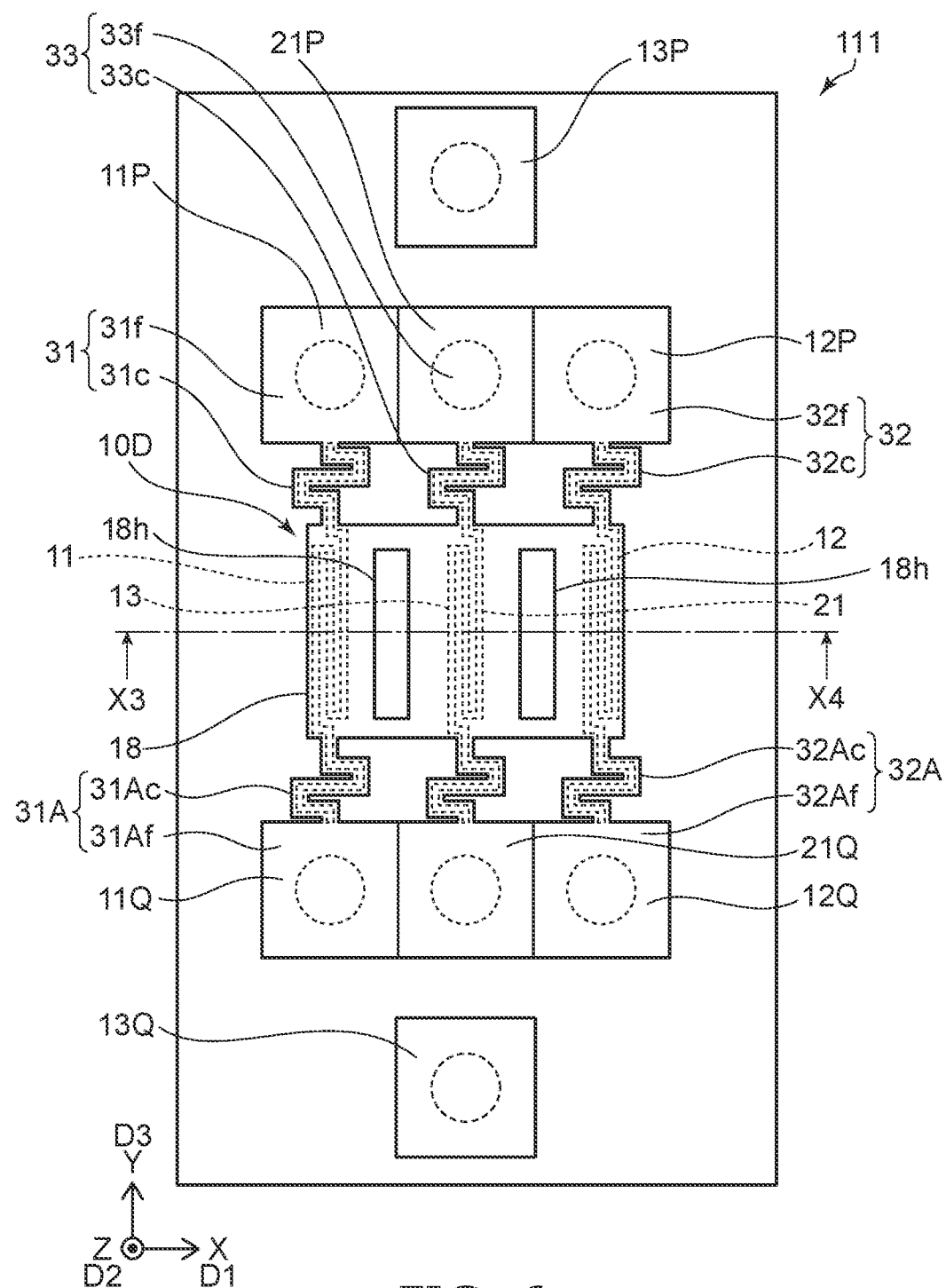
FIG. 6 is a schematic plan view illustrating the sensor according to the first embodiment.

FIG. 6 is a schematic plan view illustrating the sensor according to the first embodiment.

FIG. 5 is a cross-sectional view taken along the line X3-X4 of FIG. 6. As shown in FIGS. 5 and 6, in a sensor 111 according to the embodiment, the insulating member 18 includes a hole 18h, The hole 18h extends in the second direction D2. The hole 18h pierces the insulating member 18 along the second direction D2. By providing the holes 18h, the heat capacity of the detector 10D can be reduced. The detection is possible with faster response.

Multiple holes 18h may be provided. One of the multiple holes 18h is between the first resistance member 11 and the third resistance member 13. Another one of the multiple holes 18h is between the third resistance member 13 and the second resistance member 12. The holes 18h suppress heat conduction between the first resistance member 11 and the third resistance member 13. The holes 18h suppress heat conduction between the third resistance member 13 and the second resistance member 12. The flow rate can be detected with higher accuracy.

Figure 7:
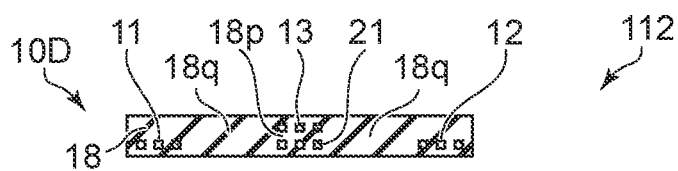
FIG. 7 is a schematic cross-sectional view illustrating a sensor according to the first embodiment.
Figure 7:
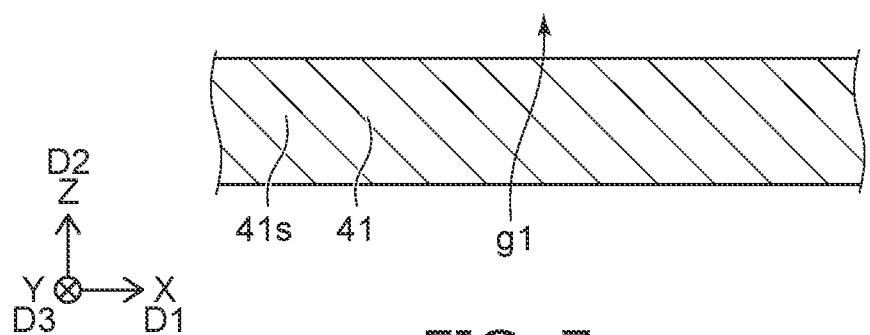

FIG. 7 is a schematic cross-sectional view illustrating a sensor according to the first embodiment.

As shown in FIG. 7, in a sensor 112 according to the embodiment, the conductive member 21 is between the first resistance member 11 and the second resistance member 12 in the first direction D1. For example, the conductive member 21 is in the same layer as the first resistance member 11. For example, the conductive member 21 is in the same layer as the second resistance member 12.

In the sensors 110 to 112, at least a part of the conductive member 21 overlaps the third resistance member 13 in the second direction D2. The first resistance member 11 includes a region that does not overlap the conductive member 21 in the second direction D2. The second resistance member 12 includes a region that does not overlap the conductive member 21 in the second direction D2, FIG. 8 is a schematic cross-sectional view illustrating a sensor according to the first embodiment.

Figure 8:
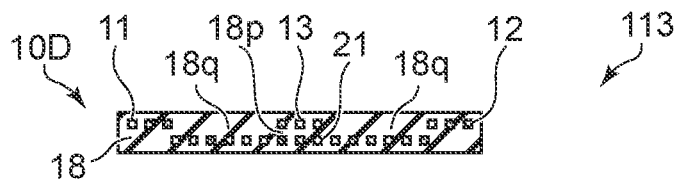
FIG. 8 is a schematic cross-sectional view illustrating a sensor according to the first embodiment.
Figure 8:
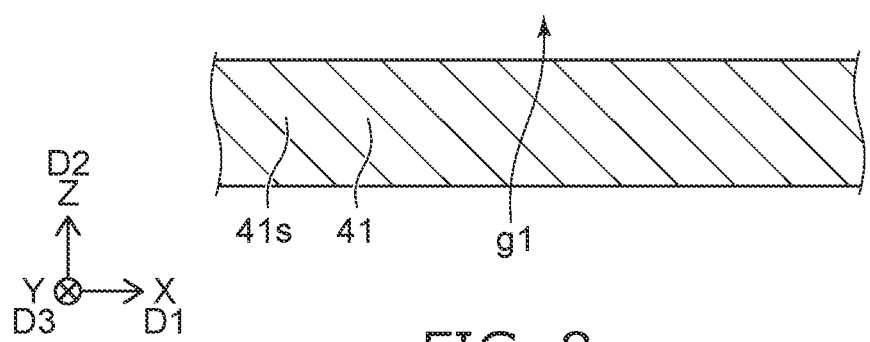

As shown in FIG. 8, the first resistance member 11 may include a region overlapping the conductive member 21 in the second direction D2, as in the sensor 113 according to the embodiment. The second resistance member 12 may include a region overlapping the conductive member 21 in the second direction D2.

Second Embodiment

Figure 9:
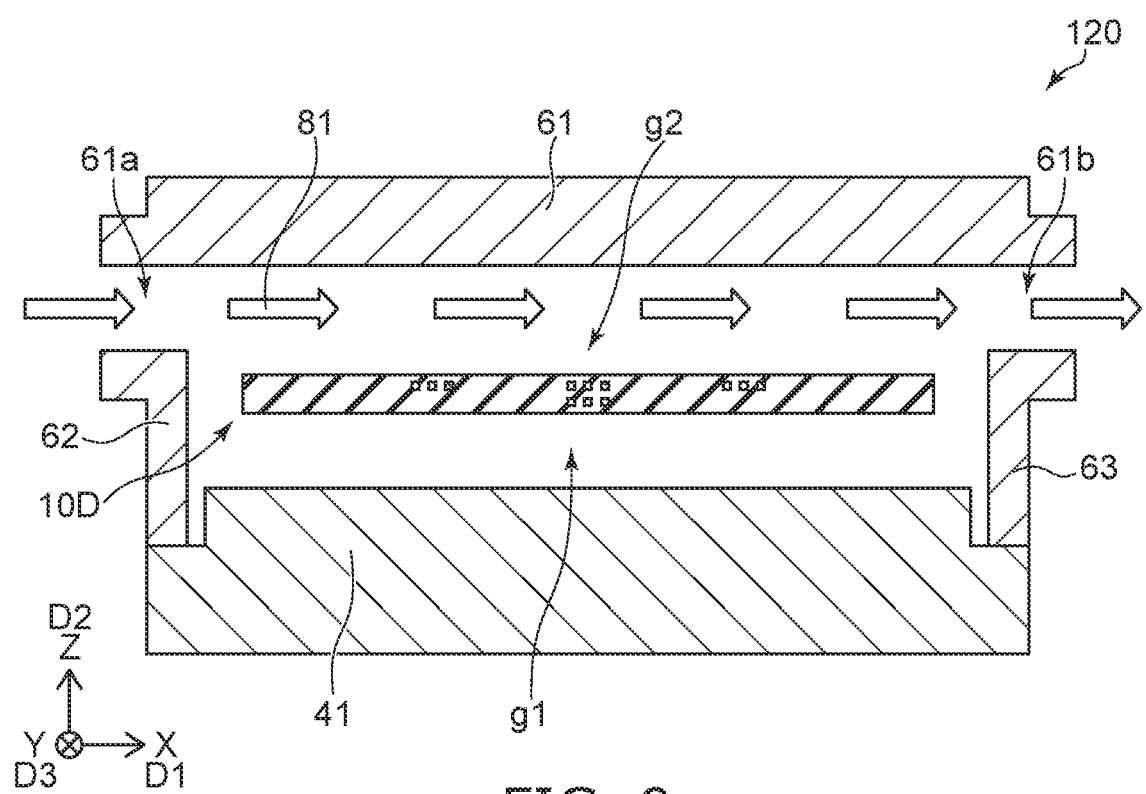
FIG. 9 is a schematic cross-sectional view illustrating a sensor according to a second embodiment.

FIG. 9 is a schematic cross-sectional view illustrating a sensor according to a second embodiment.

As shown in FIG. 9, a sensor 120 according to the embodiment includes a first structure body 61. Other configurations may be the same as those of the sensors according to the first embodiment.

There is the detector 10D between the base body 41 and the first structure body 61. A second gap g2 is provided between the detector 10D and the first structure body 61. The target substance 81 is configured to pass through the second gap g2.

For example, the target substance 81 passes through the second gap g2 along the first direction D1. The contact state between the target substance 81 and the detector 10D is stabilized. High-precision detection can be performed stably.

The sensor 120 may further include a second structure body 62 and a third structure body 63. A first opening 61a is formed by the second structure body 62 and the first structure body 61. A second opening 61b is formed by the third structure body 63 and the first structure body 61. The target substance 81 is configured to flow into the second gap g2 from the first opening 61a. The target substance 81 that has flowed into the second gap g2 is configured to flow out from the second opening 61b.

Figure 10:
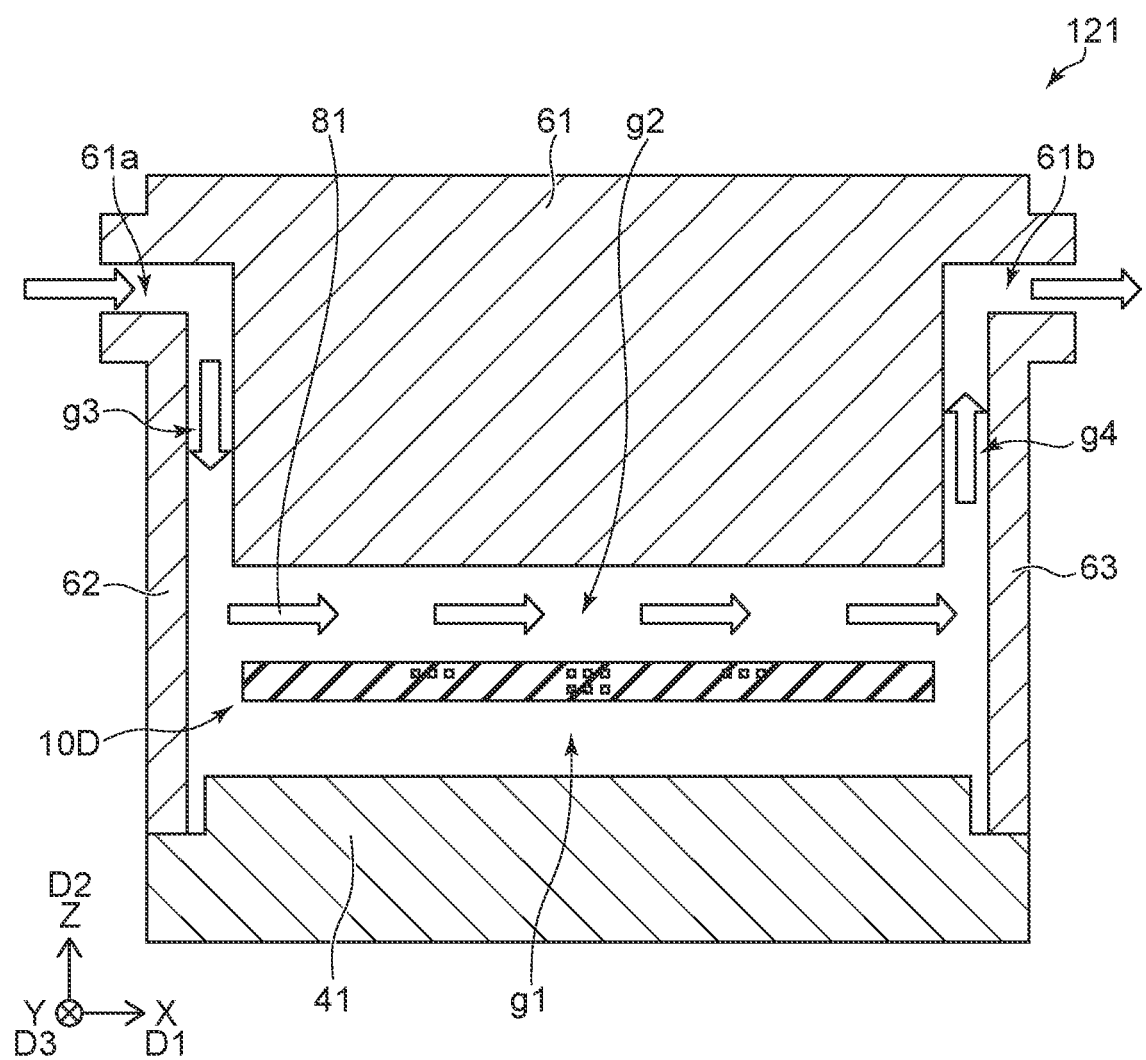
FIG. 10 is a schematic cross-sectional view illustrating a sensor according to the second embodiment.

FIG. 10 is a schematic cross-sectional view illustrating a sensor according to the second embodiment.

As shown in FIG. 10, in a sensor 121 according to the embodiment, the structure of the structure body is different from the structure of the structure body in the sensor 120. Except for this, the configuration of the sensor 121 may be the same as the configuration of the sensor 120.

In the sensor 121, a direction from a part of the second structure body 62 to a part of the first structure body 61 is along the first direction D1, A direction from a part of the first structure body 61 to a part of the third structure body 63 is along the first direction D1. A third gap g3 is provided between a part of the second structure body 62 and a part of the first structure body 61. A fourth gap g4 is provided between a part of the first structure body 61 and a part of the third structure body 63, The target substance 81 is configured to pass through the third gap g3, the second gap g2, and the fourth gap g4.

In embodiments, the target substance 81 includes, for example, one selected from the group consisting of carbon dioxide, helium, methane, chlorine, sulfur hexafluoride (SF6) and hydrogen. A second substance includes, for example, another one selected from the group consisting of carbon dioxide, helium, methane, chlorine, sulfur hexafluoride (SF6) and hydrogen.

The embodiments may include the following configurations (e.g. technical proposals).

Configuration 1
   A sensor, comprising:
     a detector including
       a first resistance member,
       a second resistance member,
       a third resistance member, a position of the third resistance member in a first direction from the first resistance member to the second resistance member being between a position of the first resistance member in the first direction and a position of the second resistance member in the first direction, and
       a conductive member, a second direction from the conductive member to the third resistance member crossing the first direction,
   a third electrical resistance of the third resistance member being configured to change depending on a target substance around the detector.

Configuration 2
   The sensor according to Configuration 1, wherein
   the detector further includes an insulating member, and
   a part of the insulating member is provided between the third resistance member and the conductive member, Configuration 3
   The sensor according to Configuration 2, wherein
   an other part of the insulating member is provided between the first resistance member and the third resistance member and between the second resistance member and the third resistance member.

Configuration 4
   The sensor according to Configuration 2 or 3, wherein
   the insulating member includes a hole extending in the second direction.

Configuration 5
  The sensor according to Configuration 2 or 3, wherein
    the insulating member includes a plurality of holes extending in the second direction,
    one of the plurality of holes is between the first resistance member and the third resistance member, and
    an other one of the plurality of holes is between the third resistance member and the second resistance member.
Configuration 6
  The sensor according to any one of Configurations 1 to 5, wherein
    a distance along the first direction between the first resistance member and the third resistance member is not less than 0.9 times and not more than 1.1 times a distance along the first direction between the second resistance member and the third resistance member.
Configuration 7
  The sensor according to any one of Configurations 1 to 6, further comprising:
    a base body; and
    a support member fixed to the base body,
    the support member supporting the detector, and
    a first gap being provided between the base body and the detector.
Configuration 8
  The sensor according to Configuration 7, further comprising:
    a first structure body,
    the detector being between the base body and the first structure body,
    a second gap being provided between the detector and the first structure body, and
    the target substance being configured to pass through the second gap.
Configuration 9
  The sensor according to Configuration 8, wherein
    the target substance passes through the second gap along the first direction.
Configuration 10
  The sensor according to Configuration 8 or 9, further comprising:
    a second structure body and a third structure body,
    the target substance being configured to flow into the second gap from a first opening formed by the second structure body and the first structure body, and
    the target substance flowing into the second gap being configured to flow out from a second opening formed by the third structure body and the first structure body.
Configuration 11
  The sensor according to Configuration 10, wherein
    a direction from a part of the second structure body to a part of the first structure body is along the first direction, and
    a direction from the part of the first structure body to a part of the third structure body is along the first direction.
Configuration 12
  The sensor according to Configuration 11, wherein
    a third gap is provided between the part of the second structure body and the part of the first structure body,
    a fourth gap is provided between the part of the first structure body and the part of the third structure body, and
    the target substance is configured to pass through the third gap, the second gap, and the fourth gap.
Configuration 13
  The sensor according to any one of Configurations 1 to 12, wherein
    at least a part of the conductive member overlaps the third resistance member in the second direction.
Configuration 14
  The sensor according to any one of Configurations 1 to 13, wherein
    the first resistance member includes a region not overlapping the conductive member in the second direction, and
    the second resistance member includes a region not overlapping the conductive member in the second direction.
Configuration 15
  The sensor according to any one of Configurations 1 to 14, wherein
    the third resistance member is between the first resistance member and the second resistance member in the first direction.
Configuration 16
  The sensor according to any one of Configurations 1 to 14, wherein
    the conductive member is between the first resistance member and the second resistance member in the first direction.
Configuration 17
  The sensor according to any one of Configurations 1 to 16, wherein
    a difference between a first electrical resistance of the first resistance member and a second electrical resistance of the second resistance member changes depending on a flow rate of the target substance in an orientation from the first resistance member to the second resistance member.
Configuration 18
  The sensor according to any one of Configurations 1 to 17, further comprising:
    a controller including a processor,
    the processor being configured to obtain a first value corresponding to a first electrical resistance of the first resistance member, a second value corresponding to a second electrical resistance of the second resistance member, and a third value corresponding to a third electrical resistance of the third resistance member, and
    the processor being configured to output a fourth value obtained by correcting the third value based on a difference between the first value and the second value.
Configuration 19
  The sensor according to Configuration 18, wherein
    the third value changes depending on the target substance.
Configuration 20
  The sensor according to Configuration 18 or 19, wherein
    the controller further includes a circuit part which is configured to at least supply a current to the conductive member or apply a voltage to the conductive member.

According to the embodiments, a sensor can be provided, in which characteristics are possible to be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as detectors, resistance members, conductive members, base bodies, controllers, etc., from known art, Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a detector including
      a first resistance member,
      a second resistance member,
      a third resistance member, a position of the third resistance member in a first direction from the first resistance member to the second resistance member being between a position of the first resistance member in the first direction and a position of the second resistance member in the first direction, and
      a conductive member, a second direction from the conductive member to the third resistance member crossing the first direction;
   a controller including a processor,
   a third electrical resistance of the third resistance member being configured to change depending on a target substance around the detector,
   the processor being configured to obtain a first value corresponding to a first electrical resistance of the first resistance member, a second value corresponding to a second electrical resistance of the second resistance member, and a third value corresponding to a third electrical resistance of the third resistance member, and
   the processor being configured to output a fourth value obtained by correcting the third value based on a difference between the first value and the second value.

2. The sensor according to claim 1, wherein
   the detector further includes an insulating member, and
   a part of the insulating member is provided between the third resistance member and the conductive member.

3. The sensor according to claim 2, wherein
   an other part of the insulating member is provided between the first resistance member and the third resistance member and between the second resistance member and the third resistance member.

4. The sensor according to claim 2, wherein
   the insulating member includes a hole extending in the second direction.

5. The sensor according to claim 2, wherein
   the insulating member includes a plurality of holes extending in the second direction,
   one of the holes is between the first resistance member and the third resistance member, and
   an other one of the holes is between the third resistance member and the second resistance member.

6. The sensor according to claim 1, wherein
   a distance along the first direction between the first resistance member and the third resistance member is not less than 0.9 times and not more than 1.1 times a distance along the first direction between the second resistance member and the third resistance member.

7. The sensor according to claim 1, further comprising:
   a base body; and
   a support member fixed to the base body,
   the support member supporting the detector, and
   a first gap being provided between the base body and the detector.

8. The sensor according to claim 7, further comprising:
   a first structure body,
   the detector being between the base body and the first structure body,
   a second gap being provided between the detector and the first structure body, and
   the target substance being configured to pass through the second gap.

9. The sensor according to claim 8, wherein
   the target substance passes through the second gap along the first direction.

10. The sensor according to claim 8, further comprising:
    a second structure body and a third structure body,
    the target substance being configured to flow into the second gap from a first opening formed by the second structure body and the first structure body, and
    the target substance flowing into the second gap being configured to flow out from a second opening formed by the third structure body and the first structure body.

11. The sensor according to claim 10, wherein
    a direction from a part of the second structure body to a part of the first structure body is along the first direction, and
    a direction from the part of the first structure body to a part of the third structure body is along the first direction.

12. The sensor according to claim 11, wherein
    a third gap is provided between the part of the second structure body and the part of the first structure body,
    a fourth gap is provided between the part of the first structure body and the part of the third structure body, and
    the target substance is configured to pass through the third gap, the second gap, and the fourth gap.

13. The sensor according to claim 1, wherein
    at least a part of the conductive member overlaps the third resistance member in the second direction.

14. The sensor according to claim 1, wherein
    the first resistance member includes a region not overlapping the conductive member in the second direction, and
    the second resistance member includes a region not overlapping the conductive member in the second direction.

15. The sensor according to claim 1, wherein
    the first resistance member, the third resistance member, and the second resistance member are arranged in a straight line extending in the first direction.

16. The sensor according to claim 1, wherein
    the conductive member is between the first resistance member and the second resistance member in the first direction.

17. The sensor according to claim 1, wherein
a difference between a first electrical resistance of the first resistance member and a second electrical resistance of the second resistance member changes depending on a flow rate of the target substance in an orientation from the first resistance member to the second resistance member.

18. The sensor according to claim 1, wherein
the third value changes depending on the target substance.

19. The sensor according to claim 1, wherein
the controller further includes a circuit part which is configured to at least supply a current to the conductive member or apply a voltage to the conductive member.

* * * * *